United States Patent [19]

Hibino et al.

[11] Patent Number: 5,235,486

[45] Date of Patent: Aug. 10, 1993

[54] TAPE CASSETTE FOR ADSORBING AND TRAPPING CORROSIVE GASES

[75] Inventors: Kunio Hibino; Hideki Yoshida; Hisayo Ohata, all of Osaka, Japan

[73] Assignee: Matsushita Electric Industrial Co., Ltd., Osaka, Japan

[21] Appl. No.: 680,725

[22] Filed: Apr. 4, 1991

[30] Foreign Application Priority Data

| Apr. 4, 1990 | [JP] | Japan | 2-89944 |
| Apr. 4, 1990 | [JP] | Japan | 2-89945 |
| Apr. 4, 1990 | [JP] | Japan | 2-89946 |
| Apr. 4, 1990 | [JP] | Japan | 2-89947 |
| Oct. 11, 1990 | [JP] | Japan | 2-273961 |
| Feb. 1, 1991 | [JP] | Japan | 3-11889 |

[51] Int. Cl.$^5$ .................. G11B 23/087; G11B 33/14
[52] U.S. Cl. ...................... 360/132; 360/137; 242/199
[58] Field of Search ............... 360/132, 137; 242/199, 242/197; 502/402; 55/74

[56] References Cited

U.S. PATENT DOCUMENTS

| 4,418,373 | 11/1983 | Fujimori et al. | 360/132 |
| 4,486,320 | 12/1984 | Sakurai et al. | 360/132 |
| 4,675,309 | 6/1987 | Hirai et al. | 502/402 |
| 4,769,730 | 9/1988 | Okamura et al. | 360/132 |
| 4,791,503 | 12/1988 | Yamamoto et al. | 360/132 |
| 4,933,797 | 6/1990 | Mitzutani et al. | 360/132 |
| 5,019,933 | 5/1991 | Karsh | 360/132 |
| 5,023,739 | 6/1991 | Shinohara et al. | 360/132 |

FOREIGN PATENT DOCUMENTS

| 3302392 | 8/1983 | Fed. Rep. of Germany . |
| 3403083 | 8/1984 | Fed. Rep. of Germany . |
| 57-9983 | 2/1982 | Japan . |
| 57-29770 | 6/1982 | Japan . |
| 58-109875 | 7/1983 | Japan . |
| 59-119532 | 7/1984 | Japan . |
| 59-207422 | 11/1984 | Japan . |
| 60-93635 | 5/1985 | Japan . |
| 61-5487 | 1/1986 | Japan . |
| 61-48481 | 4/1986 | Japan . |
| 61-118175 | 5/1986 | Japan . |
| 61-131231 | 6/1986 | Japan . |
| 61-139920 | 6/1986 | Japan . |
| 61-142525 | 6/1986 | Japan . |
| 61-151830 | 7/1986 | Japan . |
| 61-153856 | 7/1986 | Japan . |
| 61-242323 | 10/1986 | Japan . |
| 61-250825 | 11/1986 | Japan . |
| 61-61444 | 12/1986 | Japan . |
| 61-280019 | 12/1986 | Japan . |
| 61-284829 | 12/1986 | Japan . |
| 62-8325 | 1/1987 | Japan . |

Primary Examiner—Stuart S. Levy
Assistant Examiner—Craig A. Renner
Attorney, Agent, or Firm—Lowe, Price, LeBlanc & Becker

[57] ABSTRACT

A tape cassette has a magnetic tape wound and housed in a casing, the magnetic tape having a magnetic recording layer in the form of a ferromagnetic thin metal film. The tape cassette has a trap layer disposed near a portion of the magnetic tape. The trap layer is made of a resin having at least an amino group or an amide group. Even when the tape cassette is used in harsh environments in the presence of corrosive gases, the trap layer adsorps corrosive gases which have entered the tape cassette, thereby protecting the magnetic tape against deterioration.

9 Claims, 4 Drawing Sheets

TAPE CASSETTE FOR ADSORBING AND TRAPPING CORROSIVE GASES

BACKGROUND OF THE INVENTION

1. Field of the Invention

The present invention relates to a tape cassette for housing a thin-metal-film magnetic tape suitable for magnetic recording at high densities.

2. Description of the Prior Art

The modern magnetic recording technology, which is based on flux differentiation principles, has been developed together with the continued advance of magnetic tape/head systems as signal transducers.

Higher recording densities are essential for more advanced magnetic recording. To achieve magnetic recording at higher densities, efforts have been made to develop metal tapes which are to replace conventional ferric oxide tapes.

A thin-metal-film magnetic tape includes a Co-Ni-O layer deposited as a magnetic recording layer on a high-polymer film by oblique evaporation. Such a magnetic tape is known as an ME (Metal-Evaporated) tape, and is being used as a 8-mm video tape for higher recording densities.

The thin-metal-film magnetic tape is also expected to be effective in high-density digital recording. There have been made attempts to achieve better solutions to various problems caused by shorter wavelengths of signals to be recorded and also problems inherent in the materials of the thin-metal-film magnetic tape.

Particularly, a tribological approach to the problems is to give more durability to the magnetic recording layer which is made smooth to minimize spacing loss that presents a serious drawback to shorter-wavelength signals. In addition, efforts have also been made to maintain a total number of magnetic fluxes while improving shorter-wavelength characteristics with thinner magnetic recording layers, and also to prevent aging-induced deterioration due to corrosion.

Various proposals which have been put forward for the solution of the above problems basically fall under the following schemes (1) through (5):

(1) Small protrusions are provided on a magnetic recording layer to improve tape friction and abrasion (see, for example, IEEE TRANSACTIONS ON MAGNETICS, Vol. MAG-21, No. 5, pages 1524~1526 (1985), Japanese Laid-Open Patent Publications Nos. 59-207422 and 61-284829).

(2) A partially oxidized layer is effectively utilized in order to improve corrosion resistance and abrasion resistance, without having a magnetic metal film exposed (see, for example, Japanese Patent Publication No. 57-29770 and Japanese Laid-Open Patent Publication No. 61-153856).

(3) The materials and structure of a magnetic recording layer are arranged for higher resistance to corrosion and abrasion (see, for example, Japanese Laid-Open Patent Publications Nos. 59-119532 and 61-139920).

(4) Direct sliding contact between a magnetic recording layer and a magnetic head is avoided, and a protective lubricating layer is provided for the essential functioning of the magnetic layer and durability against wear due to sliding movement (see, for example, Japanese Laid-Open Patent Publications Nos. 60-93635, 61-131231, 61-142525, 61-151830, 61-242323, 61-250825, 61-280019, 62-8325, and Japanese Patent Publication No. 61-61444).

(5) Combinations of the above proposals.

The magnetic tapes which have been improved as described above are generally housed in tape cassettes. Most of the presently available tape cassettes are composed of components molded of synthetic resin and assembled together. Materials, designs, structures for easy assembly, mechanical properties, and weather resistance capabilities for tape cassettes are selected and improved according to various existing standards. For recent high-density recording applications, tape cassettes are hermetically sealed in order to prevent entry of foreign matter for protection against dropouts and head clogging (see, for example, Japanese Utility Model Publication No. 57-9983, Japanese Laid-Open Utility Model Publications Nos. 58-190875, 61-48481, 61-118175, and Japanese Laid-Open Patent Publication No. 61-5487).

Tape cassettes which are well hermetically sealed, including commercially available 8-mm video tape cassettes, R-DAT tape cassettes, and M-11 format tape cassettes for broadcasting use, are preferable in terms of improved weather resistance of thin-metal-film magnetic tapes housed therein. These hermetically sealed tape cassettes are helpful in allowing thin-metal-film magnetic tapes to be improved for practical application.

Recent widespread use by consumers and industries of video cassette recorders and video cameras has expanded their applications to a greater variety of subjects or images to be recorded under various conditions. It has been required for these video devices to withstand more rigorous environmental conditions such as high temperatures, high humidities, low humidities, and corrosive gas atmospheres in the presence of $H_2S$, $SO_2$, $Cl_2$, $NO_x$, and other harmful gases.

Conventional tape cassettes which would not cause any problems when used under normal conditions may often give rise to dropouts and head clogging during use, even for a short period of time, in harsher environments containing high concentrations of the above gases.

SUMMARY OF THE INVENTION

In view of the aforesaid shortcomings of the conventional tape cassettes, it is an object of the present invention to provide an improved tape cassette which permits a magnetic tape housed therein to effect high-density recording highly reliably even when used under highly corrosive environmental conditions.

According to the present invention, there is provided a tape cassette comprising a casing, a pair of rotatable reels disposed in the casing, and a magnetic tape wound around the reels and housed in the casing, the magnetic tape having a magnetic recording layer comprising a ferromagnetic thin metal film and a protective layer disposed on the magnetic recording layer, the casing having a trap layer disposed near a portion of the magnetic tape which extends between the reel, the trap layer being made of a resin having at least an amino group or an amide group. The casing has an opening through which the portion of the magnetic tape can be exposed. The tape cassette also includes two lids angularly movably supported on the casing, for covering both surfaces of the magnetic tape when the lids close the opening. Alternatively, the tape cassette includes a first lid angularly movably supported on the casing, for covering a front surface of the magnetic tape when the first lid closes the opening, and a second lid slidably supported on the casing, for covering a rear surface of the magnetic tape when the second lid closes the opening.

The trap layer may be made of a dissolvable acrylic resin containing dissolvable nylon or an amide group, or an acrylonitrile butadiene styrene resin having an amide group or amide and polyether groups.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
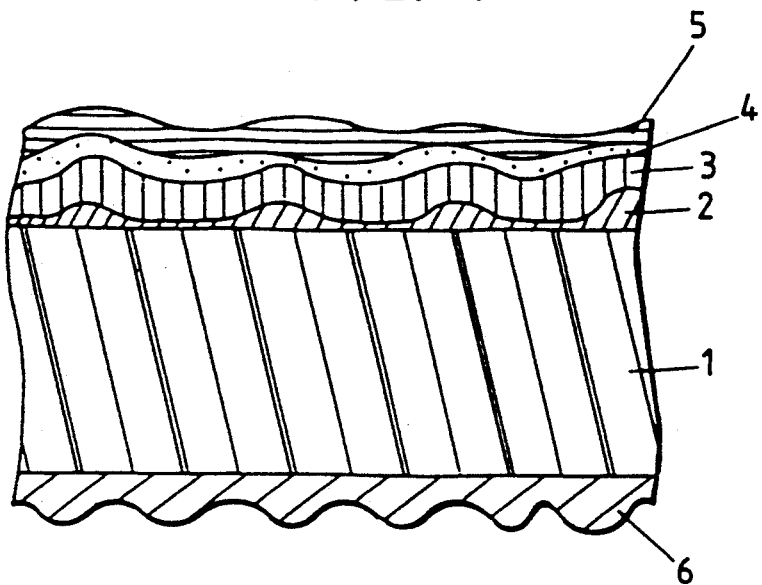
FIG. 1 is an enlarged fragmentary cross-sectional view of an ME tape for use in a tape cassette according to the present invention.

FIG. 1 shows in enlarged cross section an ME (Metal-Evaporated) tape having a protective layer for better practical applicability, the ME tape being housed in a tape cassette according to the present invention.

The ME tape shown in FIG. 1 comprises a high-polymer film 1 made of a high-polymer material such as polyethylene terephthalate, polyethylene naphthalate, or polyphenylene sulfide, a coated layer 2 of fine particles of $Al_2O_3$, $SiO_2$, $Eu_2O_3$, CaO, $ZrO_2$, or the like, a magnetic recording layer 3 in the form of a ferromagnetic thin metal film of Co-O, Co-Ni, Co-Cr, Co-Ti, Co-Si, Co-Cr-Nb, Co-Ni-O, or the like, a protective layer 4 in the form of an $SiO_2$ film, a plasma polymer film, a BN film, a hard carbon film, or the like, the protective layer 4 having an optimum thickness for minimum spacing loss, and a lubricating layer 5 made of a lubricant such as of higher fatty acid, perfluorocarbon acid, or its ester, perflouropolyether, or the like. The coated layer 2, the magnetic recording layer 3, the protective layer 4, and the lubricating layer 5 are successively deposited on one side of the high-polymer film 1. The ME tape also includes a back-coated layer 6 on the other side of the high-polymer film 1 for better transport capability of the ME tape, the back-coated layer 6 being made of a resin with a filler such as carbon black, calcium carbonate, or the like dispersed therein.

The ME tape has a width of ½ inch, 8 mm, 3.8 mm, or other dimension, and a length wound around feed and takeup reels with leader and trailer tapes at its opposite ends. The ME tape and the feed and takeup reels are housed in a tape cassette according to the present invention.

The tape cassette according to the present invention is of a relatively well hermetically sealed structure particularly suitable for use as an 8-mm video magnetic tape cassette or an R-DAT magnetic tape cassette. The tape cassette according to the present invention finds less use as a ½-inch video magnetic tape cassette for home use since this type of tape cassette has no back cover and needs not to be well hermetically sealed.

Figure 2:
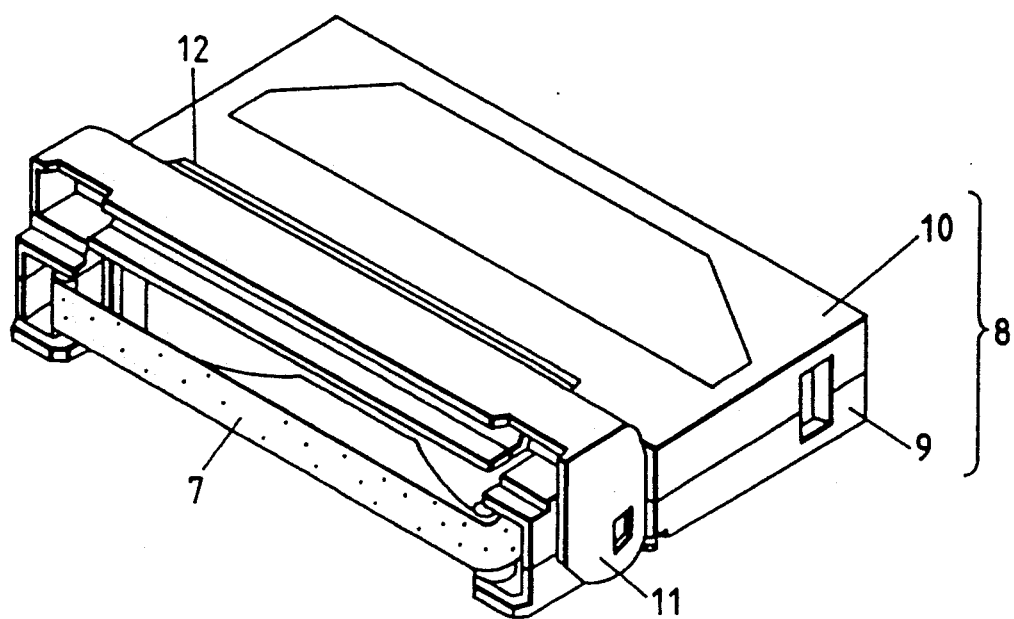
FIG. 2 is a perspective view of an 8-mm video magnetic tape cassette.

FIG. 2 shows an 8-mm video magnetic tape cassette to which the principles of the present invention are applicable. The tape cassette shown in FIG. 2 comprises a magnetic tape 7 housed in a cassette casing 8 which is composed of a casing member 9 known as a lower half and a casing member 10 known as an upper half, and a front lid 11 openably and closably pivoted on the upper half 10 for covering the front opening of the cassette casing 8 through which the magnetic tape 7 is exposed. The tape cassette also has a rear lid 12 for protecting the magnetic tape 7 as it is pulled out of the cassette casing 8 through the opening thereof.

Figure 3:
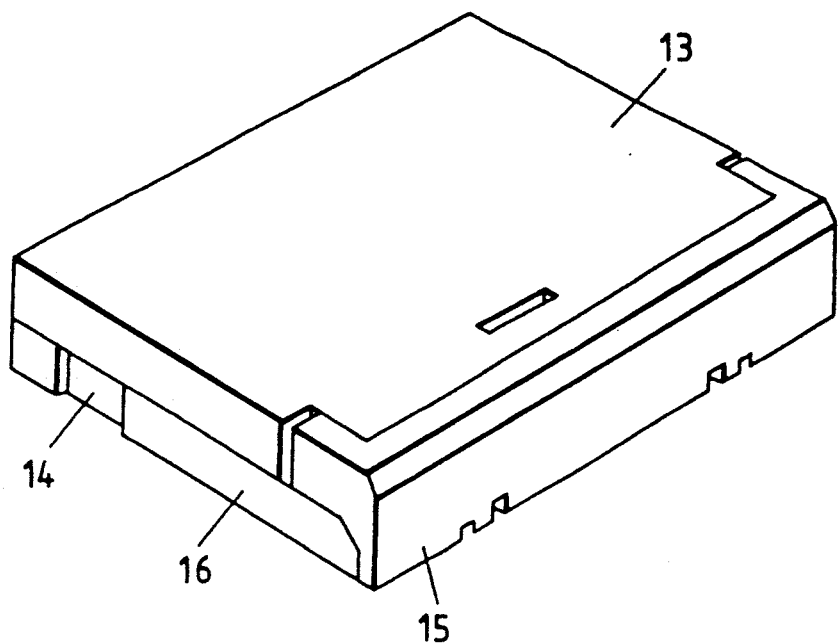
FIG. 3 is a perspective view of an R-DAT magnetic tape cassette.

FIG. 3 shows an R-DAT magnetic tape cassette to which the principles of the present invention are applicable. The tape cassette shown in FIG. 3 comprises a cassette casing housing a magnetic tape and comprising an upper half 13 and a lower half 14, a front lid 15 pivotally supported on the upper half 13 for covering the front surface of the magnetic tape extending through the front opening of the cassette casing, and a rear lid 16 slidably mounted on the lower half 14.

An ME tape which was used to ascertain the advantages of the tape cassette according to the present invention will be described in detail below.

Fine particles of $SiO_2$ having a diameter of 100 Å were coated, at a proportion of average 50 particles per 1 $\mu m^2$, on one side of a polyethylene terephthalate film having a thickness of 10 $\mu m$. Thereafter, the film was wound around a cylindrical can having a diameter of 1 m, and Co-Ni (Ni: 20 wt. %) was evaporated to a thickness of 0.1 $\mu m$ on the film at a minimum incident angle of 45° in an oxygen atmosphere under a pressure ranging from $5 \times 10^{-5}$ (Torr) to $1 \times 10^{-4}$ (Torr). On the evaporated layer, there were formed a hard carbon film having a thickness of 100 Å by DC plasma polymerization of a methane gas, and then deposited a layer, about 50 Å thick, of "KRYTOX-157, FS-M" manufactured by E. I. Du Pont and sold as a perfluoropolyether carboxylic acid. A filler was made of carbon black and calcium carbonate mixed together at a weight rate of 1:4, and 100 wt % of such a filler was dispersed in a polyester resin, and mixed with a solvent. The solution was coated and dried on the other side of the polyethylene terephthalate film remote from the magnetic layer, thus forming a back-coated layer having a thickness of 0.5 $\mu m$. The ME tape thus formed was used as an 8-mm tape, and will be referred to as an "ME-A tape".

The tape cassette according to the present invention has a trap layer for trapping corrosive gases, the trap layer containing a resin having an amino group or an amide group. The resin of the trap layer will be described below.

An amide group which has an active N-H bond such as —CONH— or —$CONH_2$ is effective for use in the present invention. Resins having such an amide group include a nylon resin having an amide group in the main chain, such as nylon 4, nylon 6, nylon 66, and their modified resins and copolymers. Resins having such an amide group in the side chain include polyacryl amide, polymethacryl amide, and their copolymers. Resins having such an amide group also include reactants of a vinyl polymer containing acrylic acid or methacrylic acid with amine compounds.

Resins having an amino group include aminopolystyrene, copolymers thereof, and acrylic resins having an amino group in the side change, such as reactants of a vinyl polymer containing acrylic acid or methacrylic acid with diamine compounds.

The above resins having an amino or amide group may be used singly or mixed with another resin.

A trap layer containing a resin of the type described above may be formed by coating a solution containing the resin on a tape cassette surface to provide a thin film as a trap layer thereon or making the cassette casing of the resin or a mixture of the resin and another resin so that a tape cassette surface itself serves as a trap layer.

Low-molecular amino or amide compounds, such as stearylamine, stearic acid amide, or the like, are also effective as a trap agent for corrosive gases. However, these compounds, used either singly to form a thin film or added to another resin, tend to come off the resin surface and hence are not practicable though they have a sufficient trapping effect.

EMBODIMENT 1

Figure 4:
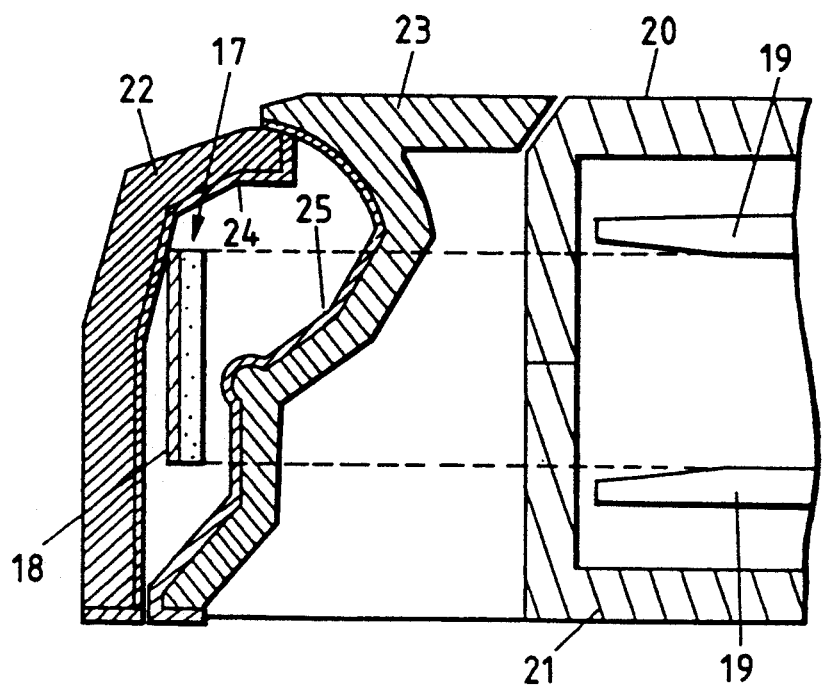
FIG. 4 is an enlarged fragmentary vertical cross-sectional view of a tape cassette according to the present invention, for use as an 8-mm video magnetic tape cassette.

FIG. 4 shows in vertical cross section a tape cassette according to a first embodiment of the present invention, the tape cassette being used as an 8-mm video magnetic tape cassette.

The tape cassette shown in FIG. 4 comprises an ME tape 17 including a Co-Ni-O magnetic layer 18 deposited by evaporation, the ME tape 17 being wound around a pair of feed and takeup reels each having vertically spaced reel flanges 19, and a cassette casing comprising an upper half 20, a lower half 21, a front lid 22, and a rear lid 23. The front and rear lids 22, 23, which cover front and rear surfaces of the ME tape 17, have respective trap layers 24, 25.

The cassette casing is made of acrylonitrile-butadiene-styrene resin (ABS resin). The trap layers 24, 25 are coated respectively on confronting surfaces and side surfaces of the front and rear lids 22, 23. Various materials of the trap layerS 24, 25 will be described below:

Modified nylon: Methoxymethyl nylon (tradename: Torezin M, manufactured by Teikoku Sangyo K. K.).

Nylon copolymer: Nylon 6/66/610 (tradename: Amiran CM, manufactured by Toray Industries, Inc.).

Polymethacryl amide: Synthesized from methacryl amide by radical polymerization.

Aminopolystyrene: Using benzoyl peroxide as an initiator, polystyrene polymerized by radical polymerization was nitrated with fuming nitric acid and then reduced, thereby synthesizing aminopolystyrene.

Aminated acrylic resin 1: Acrylic acid and methacrylate methyl (monomer ratio 1:1) were polymerized by radical polymerization using benzoyl peroxide as an initiator, and then a ½ equivalent weight of ethylenediamine was reacted with acrylic acid, thereby synthesizing aminated acrylic resin.

Tape cassettes according to inventive and comparative examples were tested for dropouts and head clogging.

In the test, two tape cassettes having such trap layers with ME-A magnetic tapes housed therein, in each of inventive examples, and two tape cassettes having no such trap layers with ME-A tapes housed therein, in each of comparative examples, were left in a desiccator filled with an HCl gas atmosphere. Thereafter, magnetic tape lengths of 1 m, one on each side of the tape pullout opening of the tape cassettes, were recorded and played back using a commercially available 8-mm video tape recorder (EV-S900 manufactured by Sony).

The conditions and results of the test are shown in Tables 1 and 2 below. Dropouts are represented by output signal reductions by 16 dB or more for 15 $\mu$sec. or longer, the dropouts being expressed as a rate of increase (also in all other Tables). The dropouts were measured continuously for 1 min. while no head clogging was experienced. Head clogging was evaluated by way of a total time, and a worse head clogging value of the two tape cassettes in each example was indicated. Some of the tape cassettes according to the comparative examples housed an ME tape (ME-B tape) which was the same as the ME-A tape except that no hard carbon film was incorporated.

TABLE 1

| | | Trap layer | | | Performance parameters | |
|---|---|---|---|---|---|---|
| | No. | Tape | Material | Thickness ($\mu$) | Dropouts (%) | Head clogging (second) |
| A | 1 | ME-A | Modified nylon | 20 | 20 | 0 |
| | 2 | ME-A | Nylon copolymer | 60 | 20 | 0 |
| | 3 | ME-A | Polymethacryl amide | 30 | 40 | 3 |
| B | 4 | ME-A | — | — | 1430 | 140 |
| | 5 | ME-B | — | — | Unmeasurable | 250 |
| | 6 | ME-B | Modified nylon | 20 | 1390 | 130 |
| | 7 | ME-B | Polymethacryl amide | 30 | 880 | 100 |

Left to stand in an atmosphere: 35° C., 85~90% RH, HCl; 3 ppm, 4 hours
A: Inventive examples
B: Comparative examples

TABLE 2

| | | Trap layer | | | Performance parameters | |
|---|---|---|---|---|---|---|
| | No. | Tape | Material | Thickness ($\mu$) | Dropouts (%) | Head clogging (second) |
| A | 8 | ME-A | Aminopolystyrene | 25 | 18 | 1 |
| | 9 | ME-A | Aminated acrylic resin 1 | 30 | 25 | 1 |
| | 10 | ME-A | Aminated acrylic resin 2 | 40 | 20 | 0 |
| B | 11 | ME-A | — | — | 1140 | 135 |
| | 12 | ME-B | — | — | Unmeasurable | 250 |
| | 13 | ME-B | Aminopolystyrene | 25 | 890 | 76 |
| | 14 | ME-B | Aminated acrylic resin 1 | 30 | 920 | 97 |

Left to stand in an atmosphere: 32° C., 85~85% RH, HCl; 2 ppm, 6 hours
A: Inventive examples
B: Comparative examples As can be seen from Tables 1 and 2, the ME tapes housed in the tape cassettes Nos. 1, 2, 3, 8, 9, 10 having a trap layer composed of a resin having an amino or amide group are protected more strongly in highly corrosive environments than those housed in the tape cassettes Nos. 4 and 11.

However, the ME tapes with no hard carbon layer, housed in the tape cassettes Nos. 5, 6, 7, 12, 13, 14 had greater dropouts and head clogging even if the tape cassettes have a trap layer. The trap layers in these tape cassettes were not satisfactory though they exhibited a certain trapping effect. This appears to result from the fact that there is no substantial difference between the adsorbing capability of the trap layer and the adsorbing capability of the ME tape with no hard carbon layer, so that corrosive gases are not selectively attracted to the trap layer. Accordingly, the tape cassette according to the present invention is particularly advantageous when used with an ME tape having a protective layer with less adsorbing forces than the trap layer.

EMBODIMENT 2

The modified nylon or aminated acrylic resin in the embodiment 1 was coated to a thickness of 10 μm on a different region of the cassette casing. The ME-A tape with a protective layer in the form of a hard carbon film was housed in the tape cassette. The tape cassette was exposed in an $Cl_2$ gas atmosphere and an $SO_2$ gas atmosphere and checked for performance parameters. The results of the test are shown in Tables 3 and 4. Those tape cassettes listed in Table 3 had a trap layer of modified nylon, and those in Table 4 had a trap layer of aminated acrylic resin.

TABLE 3

| No | Cassette | $Cl_2$ gas | | $SO_2$ gas | |
|---|---|---|---|---|---|
| | | Dropouts (%) | Head clogging (second) | Dropouts (%) | Head clogging (second) |
| 1 | 2A | 47 | 1.9 | 52 | 2.3 |
| 2 | 2B | 31 | 1.8 | 41 | 1.7 |
| 3 | 2C | 9 | 0.3 | 10 | 0.5 |
| 4 | 2D | 3 | 0 | 5 | 0 |
| 5 | 2E | 33 | 1.7 | 33 | 1.4 |
| 6 | 2F | 475 | 17 | 386 | 19 |
| 7 | 2G | 214 | 12 | 218 | 10 |
| 8 | 2H | 317 | 14 | 423 | 18 |
| 9 | 2I | 900 | 153 | 1140 | 189 |

Left to stand in an atmosphere:
$Cl_2$ gas 3.8 ppm, 20° C., 65~70% RH, 24 hours
$SO_2$ gas 1.6 ppm, 35° C., 90% RH, 24 hours

TABLE 4

| No | Cassette | $Cl_2$ gas | | $SO_2$ gas | |
|---|---|---|---|---|---|
| | | Dropouts (%) | Head clogging (second) | Dropouts (%) | Head clogging (second) |
| 10 | 2A | 55 | 1.7 | 51 | 2.1 |
| 11 | 2B | 46 | 1.5 | 39 | 1.9 |
| 12 | 2C | 13 | 0.2 | 9 | 0.7 |
| 13 | 2D | 9 | 0.4 | 5 | 0.2 |
| 14 | 2E | 45 | 3.3 | 33 | 21 |
| 15 | 2F | 701 | 24 | 411 | 27 |
| 16 | 2G | 423 | 19 | 305 | 17 |
| 17 | 2H | 516 | 21 | 660 | 25 |
| 18 | 2I | 1270 | 133 | 1060 | 181 |

Figure 5:
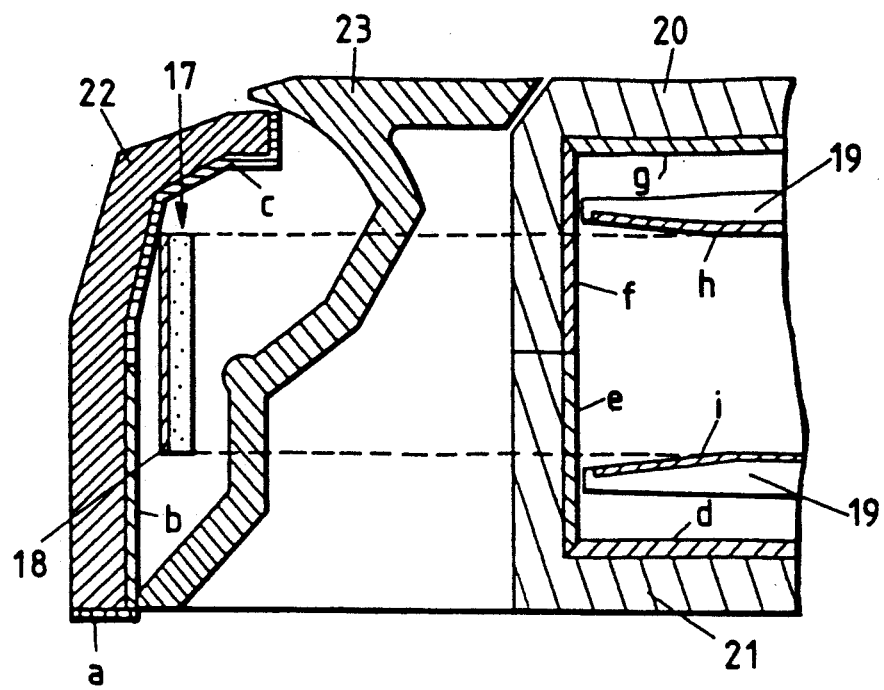
FIG. 5 is an enlarged fragmentary vertical cross-sectional view of an 8-mm video magnetic tape cassette according to the present invention.
Figure 6:
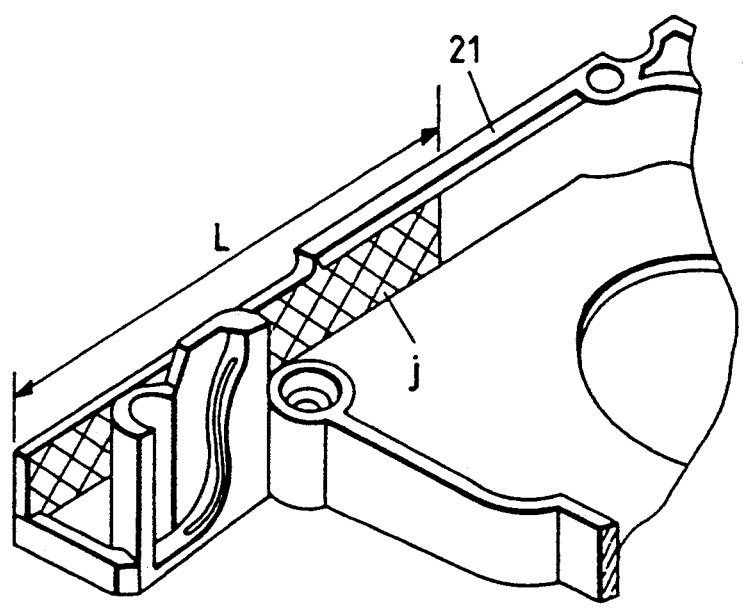
FIG. 6 is a fragmentary perspective view of a lower half of the 8-mm video magnetic tape cassette shown in FIG. 6.

Left to stand in an atmosphere:
$Cl_2$ gas 1.8 ppm, 23° C., 75~80% RH, 24 hours
$SO_2$ gas 3.3 ppm, 30° C., 85% RH, 24 hours In Tables 3 and 4, the tape cassettes 2A had trapping layers coated on surface regions a, b, c of the front lid 22 (FIG. 5) and on a surface region j on the side of the lower half 21 (FIG. 6) which faces the tape, the surface region j having a length L of 10 mm. The tape cassettes 2B were the same as the tape cassettes 2A except that the surface region j had a length of 30 mm. The tape cassettes 2C had trapping layers coated on the surface regions a, b, c of the front lid 22, the surface region j of the lower half 21, the surface region j having a length of 30 mm, and a surface region, 30 mm long, of the upper half 20 which corresponds to the surface region j. The tape cassettes 2D had trap layers coated on a surface region g of the upper half 20 and a surface region d of the lower half 21, in addition to the trap layers in the tape cassettes 2C. The tape cassettes 2E had trap layers coated on the surface regions a, b of the front lid 22 and surface regions e, d of the lower half 21. The tape cassettes 2F had trap layers coated on surface regions h, i of the feed and takeup reel flanges 19. The tape cassettes 2G had trap layers coated on surface regions d, e, f, g of the upper and lower halves 20, 21. The tape cassettes 2H had trap layers coated on the surface regions d, g of the upper and lower halves 20, 21. The tape cassettes 2I had no trap layers coated. Those parts shown in FIGS. 5 and 6 which are identical to those shown in FIG. 4 are designated by identical reference numerals.

It will be understood from Tables 3 and 4 that no sufficient trapping effect is produced even if trap layers are coated of modified nylon or aminated acrylic resin in certain surface regions. Specifically, the tape cassettes 6, 7, 8, 15, 16, 17 had a considerably improved trapping effect compared with the tape cassettes 9, 18, and trap layers should be coated in the vicinity of the magnetic tape kept taut between the reels, as can be seen from Tables 3, 4.

EMBODIMENT 3

The tape cassettes were made of ABS resin, and coated with trap layers of modified nylon on the same surfaces as those in the embodiment 1. The coated surfaces of the front and rear lids of the tape cassettes had varying surface areas. Three tape cassettes 3A, 3B, 3C were tested as shown in Table 5. The tape cassette 3A had trap layers coated to a thickness of 15 μm on flat surfaces. The tape cassette 3B had trap layers coated to a thickness of 15 μm on surfaces which had 10 grooves per 1 mm, each having a depth of 100 μm and a width of 50 μm. The tape cassette 3C had trap layers coated to a thickness of 15 μm on surfaces which had 10 recesses per 1 $mm^2$, each having a diameter of 50 μm.

ME-A tapes having a protective layer in the form of a hard carbon film were housed in the tape cassettes, and the tape cassettes were exposed, for 1 hour, in corrosive atmospheres containing 10 ppm and 2 ppm of nitric dioxide ($NO_2$) at 30° C. with 80% RH and checked for performance parameters. The results of the test are shown in Table 5.

TABLE 5

| No | Cassette | $NO_2$ 10 ppm | | $NO_2$ 2 ppm | |
|---|---|---|---|---|---|
| | | Dropouts (%) | Head clogging (second) | Dropouts (%) | Head clogging (second) |
| 1 | 3A | 30 | 2.3 | 12 | 0.5 |
| 2 | 3B | 11 | 0.5 | 7 | 0 |
| 3 | 3C | 22 | 1.0 | 10 | 0.3 |

The surface areas of the trap layers of the tape cassettes shown in Table 5 are not appreciably different from each other. However, the trapping effect is naturally smaller if the surface area of a trap layer is smaller. The trap layers should preferably have as large a surface area as the surface area of the tape length which is not wound on the reels but is exposed to the front and rear lids. Actually, however, the surface area of the trap layers is selected taking into account the material and position of the trap layers, the structure of the tape cassette, the extent to which the tape cassette is hermetically sealed, and also economic considerations.

The surface area of the trap layers may be varied by varying the surface roughness of the surface regions of the tape cassettes on which the trap layers are coated, providing fine ribs, which also double as stiffening ribs, on those surface regions of the tape cassettes, and adding fine filler particles to the coated trap layers. It has been confirmed that these expedients are effective.

EMBODIMENT 4

Figure 7:
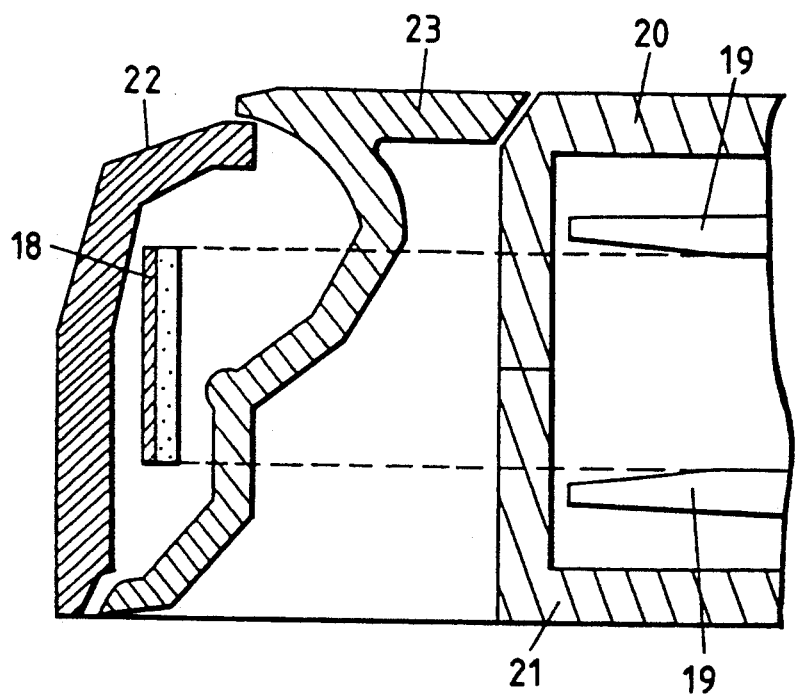
FIG. 7 is an enlarged fragmentary vertical cross-sectional view of an 8-mm video magnetic tape cassette according to the present invention.

FIG. 7 shows in vertical cross section a tape cassette according to a fourth embodiment, for use as an 8-mm video magnetic tape cassette. Those parts shown in FIG. 7 which are identical to those shown in FIG. 4 are denoted at identical reference numerals. In the fourth embodiment, the cassette casing itself is made of a material which exhibits a trapping effect.

Different components of cassette casings were made of a polymer alloy (tradename: Monkalloi NX 50, manufactured by Mitsubishi Monsanto Chemical K. K.) of ABS resin having an amide group and nylon resin (nylon 6), and ME-A tapes with a protective layer in the form of a hard carbon film were housed in the tape cassettes. The tape cassettes were exposed, for 2 hours, in a corrosive atmosphere containing 6 ppm of nitric dioxide ($NO_2$) at 35° C. with 80~85% RH and and also in 9 ppm of sulfur dioxide ($SO_2$), and checked for performance parameters. The results of the test are shown in Table 6.

TABLE 6

| | | $NO_2$ gas | | $SO_2$ gas | |
|---|---|---|---|---|---|
| No | Cassette | Dropouts (%) | Head clogging (second) | Dropouts (%) | Head clogging (second) |
| 1 | 4A | 11 | 0.9 | 12 | 1.5 |
| 2 | 4B | 7 | 0.8 | 8 | 1.0 |
| 3 | 4C | 4 | 0 | 4 | 0.5 |
| 4 | 4D | 1290 | 188 | 1420 | 197 |

In Table 6, the tape cassettes 4A, 4B, 4C are inventive examples. The tape cassette 4A had a front lid made of the polymer alloy. The tape cassette 4B had front and rear lids made of the polymer alloy. The tape cassette 4C had front and read lids, and upper and lower halves made of the polymer alloy. The other components of the tape cassettes 4A, 4B, 4C were made of ABS resin. The tape cassette 4D, which is a comparative example, is entirely made of ABS resin.

Table 6 indicates that the tape cassette No. 3, whose front and rear lids and upper and lower halves made of the polymer alloy, does not differ, as to the performance parameters, widely from the tape cassette No. 1 or 2 whose front lid or front and rear lids are made of the polymer alloy. Therefore, the performance parameters of these tape cassettes Nos. 1, 2, 3 may well fall within an allowable resin range and may be selected depending on the cost, dimensions, and mechanical properties.

The compositions of resins having a trapping effect as the materials of the tape cassettes according to the fourth embodiment may be determined depending on their tape retentivity, existing standards, and their physical properties.

EMBODIMENT 5

According to a fifth embodiment, the cassette casing itself is made of modified ABS resin (having amide and polyether groups) which has a trapping effect.

The modified ABS resin was prepared as follows: A polymer having an amide group was produced by reaction of 30 parts of a graft copolymer which was formed by polymerizing 40 parts of a monomer mixture of 70 wt. % of styrene and 30 wt. % of acrylonitrile in the presence of 60 parts of copolymer rubber comprising 10 wt. % of acrylonitrile and 90 wt. % of butadiene, with 42 parts of a copolymer of 65 wt. % of styrene, 32 wt. % of acrylonitrile, and 3 wt. % of acrylic acid, and 28 parts of polyethylene glycol diamine whose average molecular weight was 400. Different components of tape cassettes were made of such a polymer. ME-A tapes having a protective layer in the form of a hard carbon film were housed in the tape cassettes. The tape cassettes were exposed, for 45 hours, in corrosive environments of 1 ppm of an $SO_2$ gas at 23° C. with 70% RH and 2 ppm of a $Cl_2$ gas at 40° C. with 83% RH. The results of the test are shown in Table 7.

TABLE 7

| | | $SO_2$ gas | | $Cl_2$ gas | |
|---|---|---|---|---|---|
| No | Cassette | Dropouts (%) | Head clogging (second) | Dropouts (%) | Head clogging (second) |
| 1 | 5A | 12 | 0.8 | 17 | 1.2 |
| 2 | 5B | 8 | 0.3 | 10 | 0.8 |
| 3 | 5C | 7 | 0 | 6 | 0 |
| 4 | 5D | 246 | 18 | 287 | 16 |
| 5 | 5E | 1210 | 154 | 1400 | 105 |

In Table 7, the tape cassettes 5A, 5B, 5C, 5D are inventive examples. The tape cassette 5A had a front lid made of the modified ABS resin. The tape cassette 5B had front and rear lids made of the modified ABS resin. The tape cassette 5C had front and read lids, and upper and lower halves made of the modified ABS resin. The tape cassette 5D had upper and lower halves made of the modified ABS resin. The tape cassette 5E, which is a comparative example, is entirely made of normal ABS resin.

As indicated by Table 7, some of the tape cassettes exhibit no sufficient trapping effect. Specifically, the trapping effect is small though it is improved with the tape cassette No. 4 in which only the upper and lower halves were made of the modified ABS resin. It is clear from Table 7 that the components of the modified ABS resin should be positioned in the vicinity of the magnetic tape kept taut between the reels and at least the front lid which confronts the magnetic recording layer of the tape should be made of the modified ABS resin.

EMBODIMENT 6

A tape cassette according to a sixth embodiment of the present invention is used as the R-DAT tape cassette shown in FIG. 3. Trap layers were disposed on the upper half 13, the lower half 14, the front lid 15, and the rear lid 16. After an ME-A tape having a protective layer in the form of a hard carbon film was housed in the tape cassette, the tape cassette was exposed, for 4 hours, in corrosive environments containing 4 ppm of hydrogen sulfide ($H_2S$) and 3 ppm of hydrogen chloride (HCl), respectively, at 30° C. with 80% RH. Tape cassettes of various trap layer configurations were tested in this manner for rates of change, i.e., rates of increase, in a block error rate of the tapes. The results of the test are given in Table 8.

TABLE 8

| No | Cassette | H2S gas Block error rate increase (%) | HCl gas Block error rate increase (%) |
|---|---|---|---|
| 1 | 6A | 38 | 43 |
| 2 | 6B | 29 | 18 |
| 3 | 6C | 9 | 14 |
| 4 | 6D | 180 | 320 |
| 5 | 6E | 310 | 490 |
| 6 | 6F | 13 | 28 |
| 7 | 6G | 41 | 39 |
| 8 | 6H | 53 | 62 |
| 9 | 6I | 59 | 67 |
| 10 | 6J | 2300 | 4200 |

The tape cassettes 6A through 6I are inventive examples. The tape cassette 6A had a trap layer on the front lid 15. The tape cassette 6B had trap layers on the front and rear lids 15, 16. The tape cassette 6C had trap layers on the front and rear lids 15, 16 and the upper and lower halves 13, 14. The tape cassette 6D had a trap layer on the upper half 13. The tape cassette 6E had trap layers on the upper and lower halves 13, 14. The trap layers in the tape cassettes 6A through 6E were of the nylon copolymer described in the first embodiment and coated to a thickness of 10 μm on inner surfaces of the lids and halves. The tape cassette 6F had trap layers on the front lid 15, the upper and lower halves 13, 14. The tape cassette 6G had trap layers on the front and rear lids 15, 16. The trap layers in the tape cassettes 6F, 6G were of the polymer alloy of ABS resin and nylon described in the fourth embodiment. The tape cassette 6H had trap layers on the front and rear lids 15, 16, and the tape cassette 6I had a trap layer on the front lid 15. The trap layers in the tape cassettes 6H, 6I were of the modified ABS resin described in the fifth embodiment. The tape cassette 6J, which is a comparative example, had trap layers made of normal ABS resin.

The test was conducted using an R-DAT testing machine which has the same functions as those of commercially available DAT recorders. The magnetic head of the R-DAT testing machine could be easily cleanable so that its conditions were initialized for each measurement, making the results free of error irrespective of the order in which the data were measured.

It can be seen from Table 8 that the trap layers should be positioned in the vicinity of the magnetic tape kept taut between the reels and at least the front lid which confronts the magnetic recording layer of the tape should have a trap layer, as indicated by the results of the tape cassettes Nos. 1 through 3 and 6 through 9.

With the present invention, the trap layers, either provided on components of the tape cassette or made integrally with those tape cassette components, are able to trap, through adsorption, corrosive gases which tend to enter the tape cassette through gaps or clearances. Specifically, the corrosive gases introduced into the tape cassette flow toward the trap layers when the gases are dispersed due to a concentration gradient thereof. Therefore, the magnetic tape in the tape cassette is protected from the corrosive gases. Any deterioration of the magnetic tape brought about by contact with corrosive gases is therefore practically held to a minimum even when used in highly corrosive gas atmospheres.

Although certain preferred embodiments have been shown and described, it should be understood that many changes and modifications may be made therein without departing from the scope of the appended claims.

What is claimed is:

1. A tape cassette comprising:
   a magnetic tape comprising a magnetic recording layer made of a ferromagnetic thin metal film and a protective layer disposed on the magnetic recording layer;
   a pair of rotatable reels for winding the magnetic tape thereon, the magnetic tape being extended between the rotatable reels:
   a cassette casing having an opening for accessing the rotatable reels onto which the magnetic tape is wound, the magnetic tape extending between the rotatable reels and being exposed through the opening of the cassette casing:
   an openable and closable lid assembly mounted on the cassette casing for covering the magnetic tape exposed through the opening, the magnetic tape extended between the rotatable reels being covered when the openable and closable lid assembly closes the opening; and
   a trap layer, made of either a resin having an active amino group or a resin having an active amide group, which trap layer is disposed on an inside surface of the openable and closable lid assembly in confronting relationship to the magnetic recording layer of the magnetic tape, for adsorbing and trapping corrosive gases which enter the cassette casing.

2. A tape cassette according to claim 1 in which the openable and closable lid assembly comprises a front lid openably and closably pivoted on the cassette casing for covering the opening of the cassette casing, and a rear lid for protecting a portion of the magnetic tape which is pulled out of a rear end of the cassette casing.

3. A tape cassette according to claim 1 in which the openable and closable lid assembly comprises a front lid pivotally supported on the cassette casing for covering a front surface of the magnetic tape which extends through the opening of the cassette casing, and a rear lid slidably mounted on a lower part of the cassette casing for covering a rear surface of the magnetic tape, wherein the cassette casing is closed by both the front lid and the rear lid.

4. A tape cassette according to claim 1 in which the resin having the active amide group is selected from the group consisting of nylon resins having an amide group in a main chain thereof, polyacryl amide, polymethacryl amide, copolymers of the polyacryl amide, copolymers of the polymethacryl amide, reactants of vinyl polymer containing acrylic acid, and reactants of vinyl polymer containing methacrylic acid with amine compound.

5. A tape cassette according to claim 1 in which the resin having the active amino group is selected from the group consisting of aminopolystyrene, copolymers of the aminopolystyrene, and acrylic resins having an amino group in a side chain thereof, which acrylic resins include reactants of vinyl polymer containing acrylic acid, and reactants of vinyl polymer containing methacrylic acid with diamine compounds.

6. A tape cassette comprising:
   a magnetic tape comprising a magnetic recording layer made of a ferromagnetic thin metal film and a protective layer disposed on the magnetic recording layer;

a pair of rotatable reels for winding the magnetic tape thereon, the magnetic tape being extended between the rotatable reels;

a cassette casing having an opening for accessing the rotatable reels onto which the magnetic tape is wound, the magnetic tape extending between the rotatable reels and being exposed through the opening of the cassette casing;

a rear lid for protecting a portion of the magnetic tape which is pulled out of a rear end of the cassette casing; and a front lid openably and closably pivoted on the cassette casing for covering the opening of the cassette casing, wherein the front lid is provided with a trap portion which is in confronting relationship to the magnetic recording layer of the magnetic tape extending between the rotatable reels, said trap portion being made of an acrylonitrile butadiene styrene resin with an active amide group for adsorbing and trapping corrosive gases which enter the cassette casing.

7. A tape cassette according to claim 6 in which the acrylonitrile butadiene styrene resin with an active amide group also includes an active polyether group.

8. A tape cassette comprising:

a magnetic tape comprising a magnetic recording layer made of a ferromagnetic thin metal film and a protective layer disposed on the magnetic recording layer;

a pair of rotatable reels for winding the magnetic tape thereon, the magnetic tape being extended between the rotatable reels;

a cassette casing having an opening for accessing the rotatable reels to which the magnetic tape is wound, the magnetic tape extending between the rotatable reels and being exposed through the opening of the cassette casing;

a rear lid slidably mounted on a lower part of the cassette casing for covering a rear surface of the magnetic tape; and a front lid openably and closably pivoted on the cassette casing for covering the opening of the cassette casing, wherein the front lid is provided with a trap portion which is in confronting relationship to the magnetic recording layer of the magnetic tape extended between the rotatable reels, said trap portion being made of an acrylonitrile butadiene styrene resin with an active amide group for adsorbing and trapping corrosive gases which enter the cassette casing.

9. A tape cassette according to claim 8 in which the acrylonitrile butadiene styrene resin with an active amide group also includes a polyether group.

* * * * *